United States Patent [19]
Kegler et al.

[11] Patent Number: 4,803,569
[45] Date of Patent: Feb. 7, 1989

[54] WRITE ENABLE RING SENSING ARRANGEMENT FOR A MAGNETIC TAPE REEL

[75] Inventors: Ernst Kegler; Konrad Svenka; Klaus Thierauf, all of Munich, Fed. Rep. of Germany

[73] Assignee: Siemens Aktiengesellschaft, Berlin and Munich, Fed. Rep. of Germany

[21] Appl. No.: 558,879

[22] Filed: Dec. 7, 1983

[30] Foreign Application Priority Data

Feb. 8, 1983 [DE] Fed. Rep. of Germany ....... 3304261

[51] Int. Cl.⁴ .................... G11B 15/05; G11B 15/06
[52] U.S. Cl. ...................................... 360/60; 360/132
[58] Field of Search ................. 360/60, 132, 134, 137

[56] References Cited

U.S. PATENT DOCUMENTS

| | | | |
|---|---|---|---|
| 3,417,387 | 12/1968 | Rayfield | 340/174.1 |
| 3,688,300 | 8/1972 | Whysong et al. | 340/267 R |
| 3,772,662 | 11/1973 | Blair | 340/174.1 G |
| 4,063,292 | 12/1977 | Karsh | 360/60 |
| 4,184,180 | 1/1980 | Barton et al. | 360/60 |

*Primary Examiner*—Stuart N. Hecker
*Assistant Examiner*—Alyssa H. Bowler
*Attorney, Agent, or Firm*—Hill, Van Santen, Steadman & Simpson

[57] ABSTRACT

In order to be able to write in a magnetic tape inserted in a magnetic tape recorder, a write enable ring must be inserted on the rear of the magnetic tape reel. The presence and absence of the write enable ring is checked through the use of a sensing ring which is displaced in the axial direction when the tape reel having the write enable ring is put in place. At its exterior, the sensing ring has a surface in the axial direction having high reflectivity and contains a mark having low reflectivity. The presence and absence of the write enable ring is statically checked with an opto-electronic sensing element by sensing the surface having high reflectivity and dynamically checked by sensing the mark.

6 Claims, 1 Drawing Sheet

U.S. Patent  Feb. 7, 1989  4,803,569
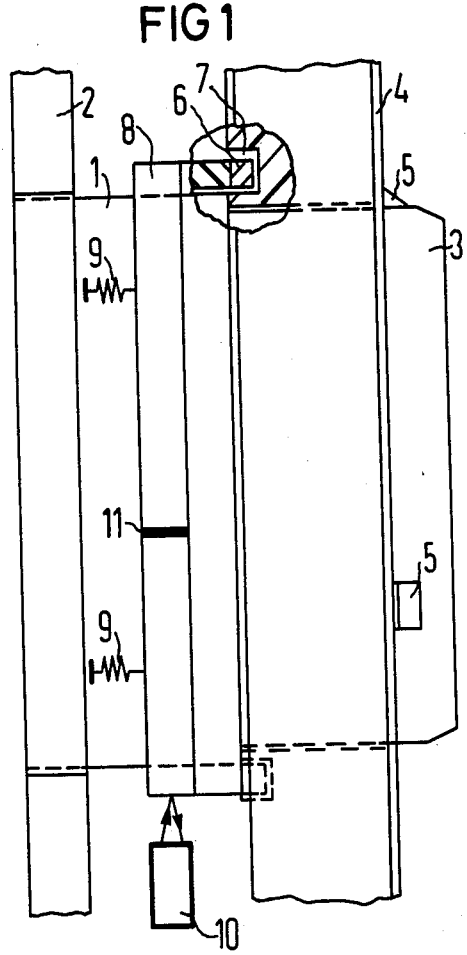
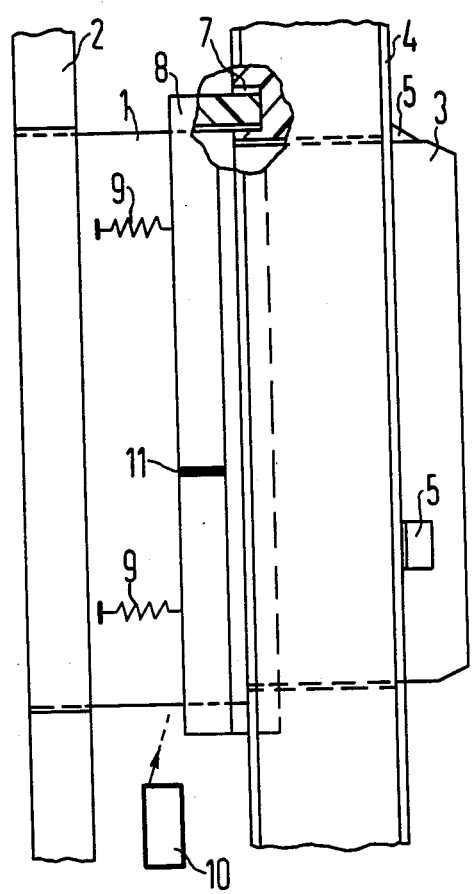
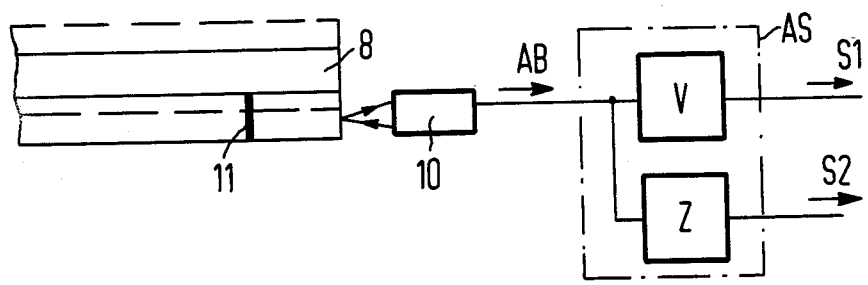

WRITE ENABLE RING SENSING ARRANGEMENT FOR A MAGNETIC TAPE REEL

BACKGROUND OF THE INVENTION

1. Field of the Invention

The present invention relates to a sensing arrangement for sensing a write enable ring in a magnetic tape reel structure in which a sensing ring is provided at a tape roll within a magnetic tape reel, the sensing ring being displaced in the axial direction given an inserted write enable ring and the outside of the sensing ring exhibiting a surface having high reflectivity, and wherein the surface is sensed with the use of an opto-electronic sensing element.

2. Description of the Prior Art

It is generally well known in the art to protect data stored on a magnetic tape against inadvertent overwriting or erasure in that a write enable ring is concentrically inserted into a recess on the rear of an appertaining magnetic tape reel. Data can be recorded on the magnetic tape or erased only given an inserted write enable ring. The magnetic tape can only be read without the write enable ring.

It is conceivable to opto-electronically check the presence and absence of the write enable ring with the use of a sensing ring and an appertaining opto-electronic sensing element. The sensing ring exhibits a diameter that corresponds to that of the write enable ring and is disposed at the roll of tape axially displaceable at the rear of the magnetic tape reel. When a write enable ring is not inserted, then the sensing ring is pushed into the corresponding recess for the write enable ring at the rear of the magnetic tape reel as a result of spring power of one or more springs. An insertion of the sensing ring into the recess is prevented, however, when the write enable ring is inserted. The displacement of the sensing ring in the axial direction is identified by an opto-electronic sensing element. To this end, the exterior, for example, of the sensing ring is provided with two surfaces in the axial direction which exhibit differing reflectivity. For example, the front half of the exterior is provided with a black color, whereas the rear half is mirrored. The opto-electronic sensing element is preferably designed as a reflecting light-barrier that senses the mirrored surface as a function of the axial displacement of the sensing ring, given lack of a write enable ring and senses the black surface given an inserted write enable ring and, therefore, generates a corresponding scanning signal that indicates the presence or absence of the write enable ring.

Only a static check of the presence or absence of the write enable ring, however, can be carried out with the assistance of such a sensing arrangement. It exhibits a relatively low operating reliability since the outage of the opto-electronic sensing elements cannot be perceived without the provision of additional steps. In this case, a wrong signaling can occur so that there is a risk that protected data on the magnetic tape will be inadvertently overwritten or erased.

A German patent application No. P 32 16 280.4, on which the present invention is based and which is fully incorporated herein by this reference, discloses a sensing device wherein the sensing ring exhibits mutually offset surfaces having different reflectivities that are scanned with the assistance of two opto-electronic sensing elements. As a function of the displacement of the sensing ring, respective surfaces having different or identical reflectivity are sensed and, given a rotation of the sensing ring, respective surfaces having different reflectivity are sensed in chronological succession so that the presence and absence of the write enable ring can be both statically and dynamically sensed.

SUMMARY OF THE INVENTION

It is therefore the object of the present invention to provide another sensing arrangement whose utilization enables the presence and absence of the write enable ring to be received with high reliability and which nonetheless requires a relatively slight expense.

Given an arrangement of the type generally set forth above, the object of the present invention is achieved in that the sensing ring exhibits a marking having a low reflectivity within the surface having the high reflectivity, and in that the sensing element senses the surface provided with the marking given an inserted write enable ring and generates scanning signals assigned to both the surface and the marking, the scanning signals being supplied to an evaluation stage.

As a result of employing the marking, it is not only possible to check the presence or absence of the write enable ring statically, but also dynamically. The static check occurs in that the sensing element, which is designed as a reflecting light barrier, emits a corresponding scanning signal given an inserted write enable ring due to the high reflectivity. Given rotation of the magnetic tape reel, the sensing element generates clock pulses as a result of the marking, the clock pulses being used for the dynamic check. Writing or erasing the magnetic tape is only possible given the appearance of the clock pulses. The width of the marking is dimensioned such that, on the one hand, an accurate interpretation of the reflected light occurs upon rotation and such that, on the other hand, the static statement concerning the presence of the write enable ring is enabled over nearly the entire circumference. Given the absence of the write enable ring, the surface having the high reflectivity is no longer located under the sensing element, so that the sensing element does not generate a scanning signal. The sensing ring can be designed such that the light emitted by the sensing element is emitted into empty space given the absence of the write enable ring or such that the light on the sensing ring impinges on a surface having low reflectivity.

The marking is advantageously designed as a slot or slit in the sensing ring. It is advantageous, in order to achieve a high contrast, when a blind hole functioning similar to a "black hole" is provided at the inside of the sensing ring below the slot. However, it can also be designed as a line-type marking.

The opto-electronic sensing element is advantageously followed by an evaluation stage which exhibits, on the one hand, an amplifier that emits scanning signals for the static check and the evaluation stage further exhibits a timer that checks the appearance of pulses during the rotation of the sensing ring given an inserted write enable ring.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 illustrates a sensing arrangement with a write enable ring inserted in a magnetic tape reel;

FIG. 2, is similar to FIG. 1, and illustrates the sensing arrangement with the absence of a write enable ring; and FIG. 3 is a block diagram of the sensing arrangement.

DESCRIPTION OF THE PREFERRED EMBODIMENTS

Referring to FIG. 1, a tape roll 1 is driven with the use of a rewind motor (not illustrated) and projects through a base plate 2 of a magnetic tape recorder. A magnetic tape reel 4 is put in place on the roll 1 and is fixed thereon, with respect to rotation by way of a plurality of claws 5. A sensing arrangement for sensing the presence or absence of a write enable ring 6 within a recess 7 at the rear of the magnetic tape reel 4 is provided at the rear of the magnetic tape reel 4. The sensing arrangement comprises a sensing ring 8 that is disposed axially displaceable on the tape drive roll 1 and that is pressed against the magnetic tape reel 4 by way of a plurality of springs 9. The sensing arrangement also comprises an opto-electronic sensing element 10 that is preferably designed as a reflecting light barrier. The sensing ring 8 is provided on its exterior with a surface having high reflectivity. The surface extends over nearly the entire circumference and is only interrupted by a mark 11. In the axial direction, the surface can extend over the entire sensing ring, or only over a portion thereof. The mark 11 is designed as a line mark or as a slot or slit in the sensing ring 8, whereby a blind hole functioning similar to a "black hole" can be provided under this slot.

When, as illustrated in FIG. 1, the write enable ring 6 is inserted in the recess 7 at the rear of the magnetic tape reel 4, the sensing ring 8 is displaced in the direction of the base plate 2 against the force of the springs 9 when the magnetic tape reel 4 is put in place. The surface of the high reflectivity now lies directly opposite the sensing element 10 so that the sensing element can determine the presence of the write enable ring 6. When the magnetic tape reel 4 turns, the sensing element 10 also perceives the mark 11 and generates corresponding pulses that are employed for the dynamic evaluation. Writing or erasing the magnetic tape is only enabled when these pulses are perceived. It is also possible to check the operability of the sensing element 10 in this manner since these pulses must constantly appear given an inserted write enable ring 6 upon rotation of the magnetic tape reel 4.

It is assumed in the illustration of FIG. 2 that the write enable ring 6 is not inserted in the recess 7. When the magnetic tape reel 4 is put in place, therefore, the sensing ring 8 is partially pushed into the recess 7 as a result of the force of the springs 9. The sensing element 10 now receives no reflected light so that the absence of the write enable ring can be perceived due to the absence of a scanning signal.

Given the block diagram illustrated in FIG. 3, an evaluation stage AS is illustrated, the evaluation stage AS interpreting the scanning signals AB emitted by the sensing element 10. The evaluation stage AS comprises an amplifier V whose output signal S1 can be directly employed for a static check of the presence or absence of the write enable ring 6. When a sensing ring A is located in the position indicated with solid lines, a scanning signal AB to which the signal S1 is assigned is generated. The amplifier V can be provided with an integrating element so that the brief interruption of the scanning signal AB due to the mark 11 does not appear in the signal S1. In contrast thereto, the appearance of the pulses or, respectively, interruptions of the scanning signal AB generated by the mark 11 is checked in a time stage Z in order to offer a signal S2 for a dynamic check. The time stage Z can, for example, be designed as a one-shot multivibrator or as a counter that is designed to be retriggerable and is always set to an unstable condition when the mark 11 is recognized.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A sensing arrangement for detecting the presence and absence of a write enable ring within a groove of a rotatable magnetic tape reel, comprising:

a write enable ring to be received in the groove of the rotatable magnetic tape reel;

a sensing ring mounted for rotation and axial movement including a portion to be received in the groove of the magnetic tape reel in the absence of the write enable ring, a peripheral reflective surface of high reflectivity, and a mark on said surface;

a single sensing element positioned to scan and sense said peripheral reflective surface and said mark to produce scanning signals only when said write enable ring is located in the groove and said sensing ring rotates; and an evaluation stage for evaluating the scanning signals for determining the axial position and rotation of said sensing ring.

2. The sensing arrangement of claim 1 wherein: said mark comprises a slot in said peripheral reflective surface.

3. The sensing arrangement of claim 1, wherein: said mark comprises a blind bore in said peripheral reflective surface.

4. The sensing arrangement of claim 1, wherein: said mark comprises a line in said peripheral reflective surface.

5. The sensing arrangement of claim 1, wherein said evaluation stage comprises:

an amplifier operable to produce first signals in response to portions of the scanning signals representing said peripheral reflective surface; and a timing stage operable to produce second signals in response to portions of the scanning signals representing said mark.

6. The sensing arrangement of claim 5 wherein: said amplifier comprises an integrator.

* * * * *